(12) United States Patent
Fromentin et al.

(10) Patent No.: US 11,852,784 B2
(45) Date of Patent: Dec. 26, 2023

(54) OPTICAL ARTICLE COMPRISING A SUBSTRATE WITH EMBEDDED PARTICLES FOR LIGHT TRANSMISSION ENHANCEMENT

(71) Applicant: Essilor International, Charenton-le-pont (FR)

(72) Inventors: Pierre Fromentin, Bangkok (TH); Hélène Maury, Charenton-le-pont (FR); Francisco De Ayguavives, Charenton-le-pont (FR); Thanisararat Saleesung, Bangkok (TH)

(73) Assignee: Essilor International, Charenton-le-pont (FR)

( * ) Notice: Subject to any disclaimer, the term of this patent is extended or adjusted under 35 U.S.C. 154(b) by 662 days.

(21) Appl. No.: 16/637,588

(22) PCT Filed: Aug. 8, 2018

(86) PCT No.: PCT/EP2018/071469
§ 371 (c)(1),
(2) Date: Feb. 7, 2020

(87) PCT Pub. No.: WO2019/030263
PCT Pub. Date: Feb. 14, 2019

(65) Prior Publication Data
US 2020/0183053 A1  Jun. 11, 2020

(30) Foreign Application Priority Data
Aug. 9, 2017  (EP) .................................... 17306061

(51) Int. Cl.
*G02B 1/111* (2015.01)
*G03B 21/625* (2014.01)

(52) U.S. Cl.
CPC ............ *G02B 1/111* (2013.01); *G03B 21/625* (2013.01)

(58) Field of Classification Search
CPC ................ G02B 1/00–1/18; G02C 7/00–7/165
See application file for complete search history.

(56) References Cited

U.S. PATENT DOCUMENTS

| | | |
|---|---|---|
| 3,904,281 A | 9/1975 | Jampolsky |
| 4,211,823 A | 7/1980 | Suzuki et al. |
| (Continued) | | |

FOREIGN PATENT DOCUMENTS

| | | |
|---|---|---|
| CN | 106483591 | 3/2017 |
| EP | 0342895 | 11/1989 |
| (Continued) | | |

OTHER PUBLICATIONS

"Silane Coupling Agents". Shin-Etsu Chemical Co. Ltd, (Jun. 2017); pp. 1-27.*

(Continued)

*Primary Examiner* — Prashant J Khatri
(74) *Attorney, Agent, or Firm* — Norton Rose Fulbright US LLP

(57) ABSTRACT

The invention relates to an optical article having a substrate made of an optical material comprising a polymer matrix and an improved light transmission in the visible range. The substrate comprises an external layer in which particles are embedded into the polymer matrix, the refractive index of the particles $R_p$ being lower than the refractive index of the polymer matrix $R_s$.

20 Claims, 1 Drawing Sheet

(56) References Cited

U.S. PATENT DOCUMENTS

Figure 1:
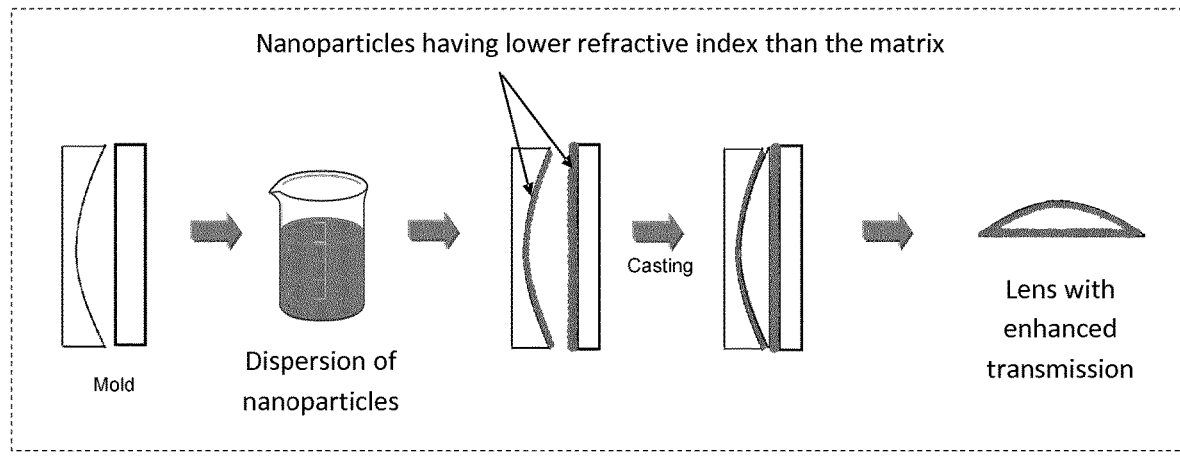

| | | | |
|---|---|---|---|
| 4,373,076 A | 2/1983 | Tarumi et al. | |
| 4,528,311 A | 7/1985 | Beard et al. | |
| 4,689,387 A | 8/1987 | Kajimoto et al. | |
| 4,775,733 A | 10/1988 | Kanemura et al. | |
| 5,059,673 A | 10/1991 | Kanemura et al. | |
| 5,087,758 A | 2/1992 | Kanemura et al. | |
| 5,191,055 A | 3/1993 | Kanemura et al. | |
| 5,492,769 A * | 2/1996 | Pryor | C23C 26/00 428/552 |
| 6,335,832 B1 * | 1/2002 | Oka | B29D 11/00 359/582 |
| 8,360,574 B2 | 1/2013 | Ishak et al. | |
| 2006/0001960 A1 | 1/2006 | Baba et al. | |
| 2006/0159923 A1 | 7/2006 | Becker-Willinger et al. | |
| 2008/0213513 A1 * | 9/2008 | Kameshima | G02B 5/0226 428/1.32 |
| 2009/0011122 A1 | 1/2009 | Dang et al. | |
| 2009/0026638 A1 | 1/2009 | Diggins et al. | |
| 2009/0040457 A1 | 2/2009 | Nakajima et al. | |
| 2010/0027116 A1 | 2/2010 | Ibuki et al. | |
| 2010/0249265 A1 | 9/2010 | Engardio et al. | |
| 2011/0217544 A1 | 9/2011 | Young et al. | |
| 2011/0248223 A1 | 10/2011 | Zheng | |
| 2012/0281292 A1 * | 11/2012 | Baca | G02B 1/113 977/773 |
| 2014/0193612 A1 | 7/2014 | Yu et al. | |
| 2014/0252282 A1 | 9/2014 | Erkelenz et al. | |
| 2015/0124315 A1 | 5/2015 | Sasahara | |

FOREIGN PATENT DOCUMENTS

| | | |
|---|---|---|
| EP | 1395417 | 3/2004 |
| EP | 3282290 | 2/2018 |
| FR | 2702486 | 9/1994 |
| JP | 2001-233611 | 8/2001 |
| JP | 2003-222703 | 8/2003 |
| WO | WO 2000/037359 | 6/2000 |
| WO | WO 2006/095469 | 9/2006 |
| WO | WO 2007/141440 | 12/2007 |
| WO | WO 2007/146933 | 12/2007 |
| WO | WO 2009/141376 | 11/2009 |
| WO | WO 2010/022353 | 2/2010 |
| WO | WO 2010/076314 | 7/2010 |
| WO | WO 2012/062790 | 5/2012 |
| WO | WO 2012/173596 | 12/2012 |
| WO | WO 2014/133111 | 9/2014 |
| WO | WO 2015/097186 | 7/2015 |
| WO | WO 2015/097492 | 7/2015 |
| WO | WO 2017/077358 | 5/2017 |

OTHER PUBLICATIONS

"Product Information: Dynasylan GLYMO". Evonik Resource Efficiency GmbH, (2016); pp. 1-3.*

Jabeen et al. "Refractive indices of diverse data set of polymers: A computational QSPR based study", Computational Materials Science, vol. 137, Sep. 2017; Available online Jun. 6, 2017; pp. 215-224.*

Gündüz, Güngör: "Chemistry, Materials, and Properties of Surface Coatings", May 2015., p. 593.

International Search Report and Written Opinion issued in corresponding application No. PCT/EP2018/071469, dated Oct. 19, 2018.

International Search Report and Written Opinion issued in corresponding application No. PCT/EP2018/071470, dated Oct. 23, 2018.

U.S. Appl. No. 16/637,603, filed Feb. 7, 2020.

* cited by examiner

OPTICAL ARTICLE COMPRISING A SUBSTRATE WITH EMBEDDED PARTICLES FOR LIGHT TRANSMISSION ENHANCEMENT

CROSS-REFERENCE TO RELATED APPLICATIONS

This application is a national phase application under 35 U.S.C. § 371 of International Application No. PCT/EP2018/071469 filed 8 Aug. 2018, which claims priority to European Patent Application No. 17306061.7 filed 9 Aug. 2017. The entire contents of each of the above-referenced disclosures is specifically incorporated by reference herein without disclaimer.

The present invention relates to optical articles comprising a substrate made of a polymer material, having improved optical properties such as light transmission in the visible range, and more particularly to ophthalmic lenses. The present invention is also directed to methods of making these optical articles.

Generally, there are three possible outcomes for the light as it passes through a transparent material, which are reflection, absorption, and transmission. The more light is transmitted through the material, the higher the transparency, visual clarity and wearer's comfort, which is an important property needed when the optical article is an eyeglass lens.

In general, a method to increase the light transmission is the application of antireflective coatings. Decreasing the reflection at both main surfaces of the a materials results in an increased transmission through said material.

Decreasing reflection is crucial especially for high refractive index materials, since the light transmission decreases with increasing material refractive index, meaning that higher refractive index materials without antireflective coating will always transmit less light than a comparable low index lens.

There are many prior art references describing how to obtain optical articles having antireflective properties. Generally, the optical article is formed in a mold in a first step, the molded product is removed, and the antireflective function is incorporated by forming or transferring a coating on the surface of the molded optical article, which methods comprise wet coating method, vacuum deposition method, lamination, etc. A coating can also be applied through the in mold coating technique (IMC), in which a coating composition is injected onto the surface of a substrate while it is still in the mold. The coating then solidifies and adheres to the substrate. Another technique disclosed e.g. in US 2009/0011122 involves forming a coating on the mold surface prior to casting/injection of the substrate material. The substrate is then cured and adheres to the coating.

WO 2010/022353 discloses a method for incorporating additives into the surfaces of coatings through modification of a coating material, comprising applying a fluid comprising particles with a size in the range of from about 0.1 nm to about 100 μm to a wet coating material disposed on a substrate, and drying the wet coating material so as to obtain a coated article wherein particles are at least partially embedded in the surface of the dried coating. This method is used to form antireflective coatings on eyeglasses.

WO 2010/022353 also discloses a method for incorporating additives at the surface of polymer articles as an alternative to dispersing the additives throughout the bulk of the material. The method comprises applying, to at least a portion of a molding form, a fluid comprising particles with a size in the range of from about 0.1 nm to about 100 μm, and molding a working composition using the treated molding form so as to obtain particles being at least partially or securely embedded in the working composition.

However, the use of a surface coating process to make a functionalized surface can involve multiple additional manufacturing steps, including surface pretreatment, additional primer layers, and suffers from complex application and curing steps, thermal expansion incompatibility, peeling, and various other disadvantages.

The coating layer must sufficiently adhere or bind to the underlying substrate so as to avoid detachment from the substrate, which is especially challenging for polymer substrates. Proper execution of coating-based techniques may require significant research and development commitments, and modifying the surface properties of a substrate material with antireflection coatings has a significant impact on the product cost.

In view of the foregoing issues, there is a need for an optical article comprising a means capable of improving light transmission through said article without the need to use antireflective surface coatings. This would be particularly interesting in the field of ophthalmic lenses, for producing economical lenses or solar lenses, which may be sold uncoated, especially if the lens substrate has a high refractive index.

The process for manufacturing such an article should be simple, easy to implement and reproducible. Another objective is to enhance productivity by shortening the preparation time of the optical article, without impairing the polymerization of the optical material composition and mechanical properties of the final optical material.

It is also desirable that the optical article exhibits a low level of yellowness, no cosmetic defects, and optionally protection from harmful UV and/or blue light. The optical article should be perceived as transparent and mostly colorless by an external observer.

The inventors have found that is was possible to modify the substrate of an optical article by embedding specific particles, preferably nanoparticles, into its surface to improve its optical properties.

To address the needs of the present invention and to remedy to the mentioned drawbacks of the prior art, the applicant provides an optical article having a substrate made of an optical material comprising a polymer matrix and an external layer in which particles are embedded into the polymer matrix, the refractive index of the particles $R_p$ being lower than the refractive index of the polymer matrix $R_s$.

The invention also relates to the use of particles for increasing the relative light transmission factor in the visible spectrum Tv of an optical article, wherein the optical article has a substrate made of an optical material comprising a polymer matrix, the substrate comprises an external layer in which particles are embedded into the polymer matrix, and the refractive index of the particles $R_p$ is lower than the refractive index of the polymer matrix $R_s$.

Figure 2:
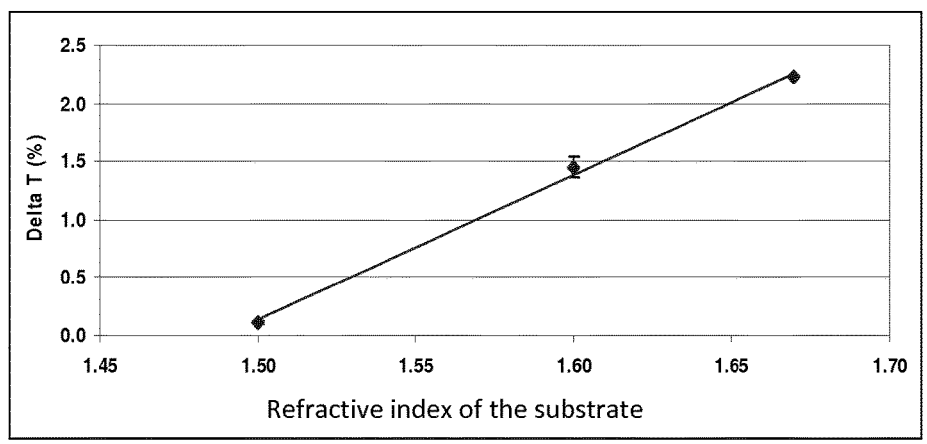

The foregoing and other objects, features and advantages of the present invention will become readily apparent to those skilled in the art from a reading of the detailed description hereafter when considered in conjunction with the accompanying drawing, wherein FIG. 1 depicts the main steps of a molding process for preparing an optical article according to the invention, FIG. 2 shows the effect of the refractive index difference between the substrate material and silica modifying particles on the transmission in the visible range of lenses according to the invention, and FIG.

3 illustrates the effect of the refractive index of the modifying particles on the transmission in the visible range for different substrate materials.

DETAILED DESCRIPTION OF THE INVENTION

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

In the present description, unless otherwise specified, an optical article/material is understood to be transparent when the observation of an image through said optical article is perceived with no significant loss of contrast, that is, when the formation of an image through said optical article is obtained without adversely affecting the quality of the image. This definition of the term "transparent" can be applied to all objects qualified as such in the description, unless otherwise specified.

The optical article according to the invention is preferably an optical lens or lens blank, more preferably an ophthalmic lens or lens blank.

The term "ophthalmic lens" is used to mean a lens adapted to a spectacle frame to protect the eye and/or correct the sight. Said lens can be chosen from afocal, unifocal, bifocal, trifocal, progressive, plano, solar and Fresnel lenses.

Although ophthalmic optics is a preferred field of the invention, it will be understood that this invention can be applied to optical articles of other types where improving optical transmission may be beneficial, such as, for example, lenses for optical instruments, in photography or astronomy, optical sighting lenses, ocular visors, optics of lighting systems, etc.

A substrate, in the sense of the present invention, should be understood to mean an uncoated substrate, and generally has two main faces. The substrate may in particular be an optically transparent material having the shape of an optical article, for example an ophthalmic lens destined to be mounted in glasses. In this context, the term "substrate" is understood to mean the base constituent material of the optical lens and more particularly of the ophthalmic lens. This material may act as a support for a stack of one or more coatings or layers.

The optical substrate may be modified on at least one of its main surfaces, for example on its front main surface, rear main surface, or preferably both main surfaces, with particles according to the invention. At least one portion of the surface of the substrate is modified by particles, for example a predetermined area such as a central part of the substrate, and preferably the whole surface of the substrate. As used herein, the rear face of the substrate is intended to mean the face which, when using the article, is the nearest to the wearer's eye. It is generally a concave face. On the contrary, the front face of the substrate is the face which, when using the article, is the most distant from the wearer's eye. It is generally a convex face.

The optical article according to the invention comprises a substrate made of an optical material comprising a polymer matrix. The substrate is an organic glass substrate, for instance an organic glass made from a thermoplastic or thermosetting resin, generally chosen from transparent materials of ophthalmic grade used in the ophthalmic industry.

Thermoplastic materials may be selected from, for instance polyamides, polyimides, polysulfones, polycarbonates, polyurethanes, polystyrenes, poly(ethylene terephthalate), polymethylmethacrylate (PMMA) and copolymers thereof. Preferred thermoplastic materials are polycarbonates.

The preferred class of polymer matrices (also referred to as "substrate material" in the present disclosure) comprises thermosetting (cross-linked) resins which may be selected from, for instance: (meth)acrylic or thio(meth)acrylic polymers and copolymers, in particular halogenated ones, or polyethoxylated aromatic (meth)acrylates, such as those derived from bisphenol-A, urethane and thiourethane polymers and copolymers, resulting from the polymerization of at least one polyisocyanate and at least one polyol or polythiol (marketed, for instance, under the trade name Trivex® by the PPG Industries company), epoxy polymers and copolymers (polyepoxides), episulfide polymers and copolymers, such as those resulting from the polymerization of least one polyepisulfide and at least one polythiol, resins resulting from polymerization or (co)polymerization of alkylene glycol bis allyl carbonates such as polymers and copolymers of diethylene glycol bis(allylcarbonate) (marketed, for instance, under the trade name CR-39® by the PPG Industries company, the corresponding marketed lenses being referred to as ORMA® lenses from ESSILOR). The preferred thermoset substrate materials are made of resins resulting from polymerization or (co)polymerization of alkylene glycol bis allyl carbonates such as polymers and copolymers of diethylene glycol bis(allylcarbonate), or polyurethane, or polythiourethane resins, such as those having a refractive index of 1.60 or 1.67, or polyepisulfide resins, such as those having a refractive index of 1.74.

Specific examples of polymer matrices suitable to the present invention are those obtained from thermosetting polythiourethane resins, which are marketed by the Mitsui Toatsu Chemicals company as MR series, in particular MR6®, MR7®, MR8® and MR10® resins. These materials as well as the monomers used for their preparation are especially described in the patents U.S. Pat. Nos. 4,689,387, 4,775,733, 5,059,673, 5,087,758 and 5,191,055.

The polymer matrix of the substrate has preferably a refractive index $R_s$ higher than or equal to 1.5, preferably higher than or equal to 1.55, more preferably higher than or equal to 1.6.

The substrate of the optical article comprises an external layer in which particles are embedded into the polymer matrix, the refractive index of the particles $R_p$ being lower than the refractive index of the polymer matrix $R_s$.

The external layer of the substrate in which the particles are embedded generally has a thickness that is substantially uniform, and preferably lower than or equal to 1 µm, more preferably lower than 500 nm. For the sake of clarity, particles are only embedded in the external layer of the substrate, and not in the bulk of the substrate.

By "embedded", it is meant that particles are either totally surrounded by the substrate or partially surrounded by substrate. In the latter case, particles are still strongly mechanically bound to the substrate, though adjacent to the surface. The degree of embedding will depend on the process and surface topography of the mold. Pressure and/or temperature may optionally be adjusted to control the degree of embedding.

In some aspects of the invention, the particles have a refractive index $R_p$ lower than or equal to 1.6, preferably lower than or equal to 1.55, more preferably lower than or equal to 1.5, even more preferably lower than or equal to 1.45. In one embodiment of the invention, the refractive index of the particles $R_p$ and the refractive index of the polymer matrix $R_s$ are such that $R_p+0.1<R_s$, preferably $R_p+0.15<R_s$, more preferably $R_p+0.2<R_s$, even more preferably $R_p+0.25<R_s$. The substrate having embedded particles in an external layer exhibits antireflective properties, especially when there is a significant refractive index difference between the substrate matrix and embedded particles.

In a preferred embodiment, the substrate of the optical article comprises less than 1% by weight, relative to the weight of the substrate, of (embedded) particles having a refractive index $R_p$ higher than or equal to the refractive index of the polymer matrix $R_s$, and more preferably does not comprise such particles.

The particles are generally inorganic particles, and preferably metal oxide, metal hydroxide or metal fluoride particles. In the present description, the term "metal" includes "metalloid".

Non-limiting examples of particles that may be used include particles of silicon oxide (preferably $SiO_2$), aluminum oxide (such as sapphire), alumina-doped silicon oxide, magnesium oxide (MgO), calcium oxide (CaO), magnesium fluoride $MgF_2$, lanthanum fluoride $LaF_3$, aluminum fluoride $AlF_3$, cerium fluoride $CeF_3$, $Mg(OH)_2$, $Ca(OH)_2$ and $Al(OH)_3$. Mixtures of two or more particles can be used. The most preferred particles are silica, $Al_2O_3$ and $MgF_2$, preferably silica and $MgF_2$. Indeed, it has been shown that the transmission gain due to the use of particles embedded in the substrate matrix is all the greater if the refractive index difference between the substrate matrix and the modifying particles is significant. Therefore it is preferable to use particles having a low refractive index.

In this regard, the particles may advantageously be porous or hollow to further decrease their refractive index. The preparation and use of such particles have been extensively described in the literature, in particular in the patent applications WO 2006/095469, JP 2001-233611, WO 00/37359 and JP2003-222703. Such particles are also commercially available from the Catalysts & Chemicals Industries Co. (CCIC), for example in the form of porous silica sols under the trade name THRULYA®.

Particles may also suitably include one or more functional agents. Such additives are useful in conferring additional, useful properties to the particles. In embodiments of the invention, the additive is contained in the particles or grafted to the particles, and is preferably a light-absorbing additive or any other functional compound. The light-absorbing additive may be chosen, without limitation, from a dye, a photochromic compound (to produce an article that exhibits a color change when exposed to particular radiation), an infrared absorber and a UV absorber. Thus, the particles may be modified by grafting an organic group or a molecule, especially by grafting onto a silicon atom. These molecules can also be included in the particles, for example by encapsulation, to bring specific added values, such as disclosed, e.g., in the application EP 16306039.5 in the name of the Applicant.

The particles may also be composite particles based on two or more metal oxides, fluorides or hydroxides, or at least one of such materials and at least one polymer (e.g., hybrid particles having a core/shell structure, or Janus particles). Composites such as $SiO_2/TiO_2$, $SiO_2/ZrO_2$, $SiO_2/TiO_2/ZrO_2$, or $TiO_2/SiO_2/ZrO_2/SnO_2$, or reactive core-shell particles having at least one metal oxide, fluoride or hydroxide as the core and a polymerizable material as the shell, such as a pre-polymer, may be employed. The reactive groups of the latter particles may react with each other under thermal or UV treatment or further crosslink with reactive material of the substrate matrix, such as polymerizable compounds, during the preparation of the optical article, providing a dense network and thus a harder substrate surface.

In one embodiment of the invention, the embedded particles are modified by functionalization with a silane coupling agent, as defined hereafter.

Preferred particle diameter is less than 150 nm (in this case, particles are nanoparticles), and preferably ranges from 2 to 100 nm, from 2 to 50 nm and from 5 to 40 nm, more preferably from 5 to 20 nm, better from 10 to 15 nm. The size of the particles in a liquid is determined by conventional methods such as light scattering, and particles size analyzer. The size of the particles in a solid is determined by tunneling electron microscope or light scattering.

The particles may include a homogeneous or heterogeneous population of particles, and may include particles of different sizes, different natures, or both. In this way, the user may embed multiple kinds of particles with multiple kinds of functionalities to deliver various properties in accordance with the final use of the product.

In some embodiments, the distribution of the homogeneous or heterogeneous population of particles is not the same on the surface of the substrate, leading to the possibility of having a gradient of particles.

In some embodiments, particles may be made of a mixture of small sized-particles, for example having a diameter of from 10 to 15 nm and of larger sized-particles, for example having a diameter of from 30 to 80 nm. Low diameter particles are preferred, as bigger particles tend to slightly decrease transmission and increase haze of the optical article due to light scattering.

The polymer matrix of the present optical article can be obtained from methods that are well known to those of ordinary skill in the art, typically from an optical material composition (substrate composition or molding composition), which can be an optical material resin or a polymerizable composition.

The optical material composition that can contain additives commonly used in the art, for example internal mold release agents (described e.g. in US 2014/252282), resin modifiers, light stabilizers, UV absorbers, near infrared absorbers, polymerization catalysts/initiators, color balancing agents, chain extenders, crosslinking agents, free radical scavengers such as antioxidants and hindered amine light stabilizers, dyes, pigments, fillers, surfactants, and adhesion accelerators.

The optical material composition according to the invention generally comprises a system for initiating the polymerization (initiator or catalyst). The polymerization initiating system can comprise one or more thermal or photochemical polymerization initiating agents or alternatively, a mixture of thermal and photochemical polymerization initiating agents, depending on the nature of the polymerizable compounds. Generally, the initiating agents are used in a proportion of 0.01 to 5% by weight with respect to the total weight of polymerizable compounds present in the composition.

In particular, for substrates resulting from polymerization or (co)polymerization of polyurethane and polythiourethane resins, preferred catalysts are selected from alkyltins, alkyltin oxides, metal coordination complexes or amines, more preferably alkyltins. A preferred proportion for alkyltins is 0.02 to 2% by weight with respect to the total weight of polymerizable compounds present in the composition. Preferred alkyltins are dibutyltin dichloride and dimethyltin dichloride.

Free radical initiators that are typically recommended for use with polyol(allyl carbonate) monomers, such as diethylene glycol bis(allyl carbonate), are diisopropyl peroxydicarbonate (IPP), benzoyl peroxide (BPO), di-sec-butyl peroxydicarbonate (Arkema Lup225), bis(tert-butylcyclohexyl) peroxydicarbonate (Akzo Perkadox 16) and monoperoxycarbonate initiators, such as tert-butylperoxy isopropyl carbonate.

According to the invention, the optical material can comprise at least one absorbing dye that at least partially inhibits transmission of light in the 400 nm to 500 nm wavelength range, i.e., the blue wavelength range, more preferably the 415-455 nm range or the 420-450 nm range. Blue light cutting dyes are extensively described in WO 2017/077358, in the name of the applicant.

In one embodiment of the invention, the optical material further comprises at least one UV absorber in order to reduce or prevent UV light from reaching the retina (in particular in ophthalmic lens materials), but also to protect the substrate material itself, thus preventing it from weathering and becoming brittle and/or yellow. Said UV absorber also limits or even eliminates photo-degradation of dyes and absorbers contained in the substrate. It can also be incorporated into a coating present at the surface of the optical article.

The UV spectrum has many bands, especially UVA, UVB and UVC bands. Amongst those UV bands reaching the earth surface, UVA band, ranging from 315 nm to 380 nm, and UVB band, ranging from 280 nm to 315 nm, are particularly harmful to the retina.

The UV absorber that may be used in the present invention preferably has the ability to at least partially block light having a wavelength shorter than 400 nm, preferably UV wavelengths below 385 or 390 nm.

Most preferred ultraviolet absorbers have a maximum absorption peak in a range from 350 nm to 370 nm and/or do not absorb light in the 465-495 nm range, preferably the 450-550 nm range. In one embodiment, the UV absorber does not absorb any substantial amount of visible light.

In a preferred embodiment, the UV absorber has the ability to at least partially cut blue light, and thus presents an absorption spectrum extending to a selected wavelength range within the visible blue light range of the electromagnetic spectrum (400-500 nm region), in particular the wavelength band with an increased dangerousness, i.e., the 415-455 nm range, preferably the 420-450 nm range.

Suitable UV absorbers include without limitation substituted benzophenones such as 2-hydroxybenzophenone, substituted 2-hydroxybenzophenones disclosed in U.S. Pat. No. 4,304,895, 2-hydroxy-4-octyloxybenzophenone (Seesorb 102®) 2,7-bis(5-methylbenzoxazol-2-yl)-9,9-dipropyl-3-hydroxyfluorene, 1,4-bis(9,9-dipropyl-9H-fluoreno [3,2-d] oxazol-2-yl)-2-hydroxyphenyl, 2-hydroxyphenyl-s-triazines and benzotriazoles compounds.

The UV absorber is preferably a benzotriazole compound. Suitable UV absorbers from this family include without limitation 2-(2-hydroxyphenyl)-benzotriazoles such as 2-(2-hydroxy-3-t-butyl-5-methylphenyl) chlorobenzotriazole, n-octyl-3-[3-tert-butyl-4-hydroxy-5-(5-chloro-2H-benzotriazol-2-yl)phenyl] propionate (Eversorb 109®), 2-(2'-hydroxy-5'-t-octylphenyl) benzotriazole, 2-(3'-methallyl-2'-hydroxy-5'-methyl phenyl) benzotriazole or other allyl hydroxymethylphenyl benzotriazoles, 2-(2-hydroxy-5-methylphenyl)-2H-benzotriazole (Seesorb® 701), 2-(3,5-di-t-amyl-2-hydroxyphenyl) benzotriazole, and the 2-hydroxy-5-acryloxyphenyl-2H-benzotriazoles disclosed in U.S. Pat. No. 4,528,311. Preferred absorbers are of the benzotriazole family. Commercially available products include Tinuvin® and Chimassorb® compounds from BASF such as Tinuvin® 326, Seeseorb® 701 and 703 from Shipro Kasei Kaisha, Viosorb 550® from Kyodo Chemicals, and Kemisorb 73® from Chemipro and TCP Tinuvin Carbo Protect from BASF.

The UV absorbers are preferably used in an amount representing from 0.1 to 5% of the weight of the optical material, and preferably from 0.2 to 2%.

In one embodiment, the optical material composition comprises at least one color-balancing component in order to obtain an optical article having a cosmetically acceptable appearance for the wearer/user and when viewed by an external observer, in particular perceived as mostly color neutral. Indeed, blue light blocking means such as dyes or specific UV absorbers that can be present in the polymerizable composition tend to produce a color tint in the optical article as a "side effect", the latter appearing yellow, brown or amber if no color balancing means is employed.

In the present invention, the color balancing agent is preferably a bluing agent, i.e., a compound having an absorption band in the visible light spectrum in the orange to yellow wavelength region and manifesting a color from blue to violet. Color balancing agents are extensively described in WO 2017/077358, in the name of the applicant. More details concerning this embodiment, such as the arrangement of the color-balancing component relative to a system blocking blue light wavelengths, and further exemplary systems including a blue light blocking component and a color-balancing component can be found e.g. in U.S. Pat. No. 8,360,574, WO 2007/146933, WO 2015/097186, WO 2015/097492.

The color balancing component is generally used in an amount sufficient to adjust the hue of the optical material, typically from 0.01 to 5% by weight, more preferably from 0.1 to 2%, relative to the weight of the optical material composition.

The color balancing components, dyes and UV absorbers are generally incorporated into the substrate of the optical article, but can also be incorporated in at least one coating/film applied on the surface of the substrate, such as a primer coating or hard coat.

The invention further relates to a plastic eyeglass lens comprising a lens substrate, the lens substrate being obtained from the above disclosed optical material, preferably by molding.

The method for preparing a substrate made of an optical material comprising a polymer matrix, having an external layer in which particles are embedded in the polymer matrix will now be described.

The inventors succeeded in incorporating an antireflective function to the substrate of an optical article directly during the manufacturing step of the substrate itself, which is an unprecedented achievement.

A preferred method for obtaining an optical article which includes a substrate made of an optical material according to the invention, i.e., with a layer of embedded particles, comprises covering at least one portion of the inner face of a mold by particles and using the covered mold to form the substrate through a process such as casting polymerization (forming a thermosetting substrate matrix by curing a liquid composition) or injection molding (forming a thermoplastic or thermosetting substrate matrix, generally a thermoplastic one). The present method is compatible with existing molding processes, since particles are applied on the inner surface of a mold before the casting process. It is summarized on FIG. 1.

Injection molding comprises injection of a thermosetting or thermoplastic material, for example a polycarbonate-based material, into an injection mold. Molds for optical use are highly polished. The mold having at least one portion of its inner surface covered by particles, in predetermined areas such as a central area of the mold or preferably the whole surface of the mold, is fed, in a manner known per se so as to fill the mold cavity, by a device for compression and injection of the material, which comprises an injection nozzle, a compression screw and a heating device. After heating and/or curing, the mold is opened, and after cooling, an optical article according to the invention can be recovered.

The preferred method is however casting polymerization. Thus, the invention relates to a method for preparing an optical article such as herein described, comprising:
  (a) providing a mold having an inner face,
  (b) covering at least one portion of said inner face of the mold by particles, preferably the whole surface of the mold,
  (c) filling the mold with a polymerizable composition,
  (d) curing said polymerizable composition, and
  (e) obtaining an optical article comprising a substrate made of an optical material comprising a polymer matrix, the substrate having an external layer in which particles are embedded into the polymer matrix, the refractive index of the particles $R_p$ being lower than the refractive index of the polymer matrix $R_s$. $R_s$ is preferably higher than or equal to 1.5, more preferably higher than or equal to 1.6, while the particles preferably have a refractive index $R_p$ lower than or equal to 1.6, and generally $R_p+0.1<R_s$, preferably $R_p+0.2<R_s$ Molds are well-known in the art, and the optimal mold for a particular application will be easily identified by the user of ordinary skill in the art. The mold may be of virtually any shape.

In one embodiment, for example when the mold is a glass mold, it is preferred to cap the inner surface of the mold with at least one capping agent such as an organosilane, before step (b). Indeed, glass molds comprise surface silanol groups prone to react by forming covalent bonds with excess/unreacted silane coupling agent that may be present in the coating composition comprising the particles and therefore at the surface of the resulting substrate, and may prevent disassembling the molded article from the mold. A step of capping the mold enables introduction of end groups that resist further reaction, such as terminal alkyl groups. The mold surface is thus covered with the capping agent to favor mold disassembly.

Exemplary capping compounds capable of suppressing reactive groups present at the surface of a mold include n-propyltrimethoxysilane, n-propyltriethoxysilane, methyltriethoxysilane, n-octyltrimethoxysilane, n-octyltriethoxysilane, phenytrimethoxysilane, 3-isocyanatopropyltrimethoxysilane, 3-(methacryloyloxy)propyl trimethoxysilane, 3-aminopropyltrimethoxysilane, 2-[methoxy(polyethyleneoxy)propyl]-trimethoxysilane, 3-mercaptopropyltrimethoxysilane, dimethyldiethoxysilane, γ-glycidoxypropyltrimethoxysilane, 3-isocyanatopropyltriethoxysilane, methoxytri(ethyleneoxy)propyltrimethoxysilane, a fluoroalkyltrialkoxysilane, or a mixture thereof.

Hydrophobic capping compounds such as octyltriethoxysilane are preferred because they lead to an easier mold disassembly process due to lower surface tension.

The capping composition generally comprises at least one capping agent, at least one solvent such as water, an alcohol, a ketone, an ester or combinations thereof, preferably an alcohol such as methanol, ethanol or isopropanol optionally used with water, and optionally an acidic catalyst, such as hydrochloric acid or acetic acid, as the organosilane coupling agent may be used under the form of a silane precondensed solution, as described hereunder in the context of the description of silane coupling agents.

The capping composition is generally applied on the mold in liquid phase, and then dried and/or cured at room temperature or by heating.

In step (b) of the above process, at least a portion of the inner face of the mold is covered by particles. The degree of coverage may be dictated by the needs of the user; in some situations, the user may not require more than a small portion of the surface area to be occupied by particles.

As the material deposited on the mold is in particulate form and the particles are homogeneously dispersed on the mold surface, a porous layer is yielded, in which the substrate material will diffuse, contrary to techniques involving the formation of a continuous layer in a mold. Limiting the amount of binder in the coating composition ensures that a continuous layer is not formed. Particles are preferably used under a colloidal form, more preferably as a colloid functionalized by a silane coupling agent. Colloidal particle preparation requires well known methods. As used herein, "colloids" are fine particles the mean diameter of which (or the largest size of which in case of elongated particles) is less than 150 nm, more preferably less than 100 nm, dispersed within a dispersing medium such as water, an alcohol, a ketone, an ester or combinations thereof, preferably an alcohol such as methanol, ethanol or isopropanol. With such low mean particle diameter, the transparency of the substrate will not be affected.

The most preferred colloidal particles are colloidal particles of at least one metal oxide, metal hydroxide or metal fluoride, in particular silica, $Al_2O_3$ and $MgF_2$ colloids, preferably silica. These particles may be prepared by the Stöber method. The Stöber method is a simple and well known method comprising a hydrolysis and condensation of the ethyl tetrasilicate $Si(OC_2H_5)_4$ in ethanol catalyzed by ammonia. The method allows to obtain a silica directly in ethanol, a quasi monodispersed particle population, a controllable particle size and a particle surface ($SiO^-NH_4^+$). Silica colloids are also marketed by DuPont de Nemours under the commercial name Ludox®.

The particles are preferably used in a coating composition containing 0.5 to 10% by weight of particles, colloidally dispersed in a dispersion medium, more preferably 1 to 8% or 1 to 5% by weight, relative to the total weight of the composition. The weight content of particles can be adapted to increase or decrease the thickness of the external layer of the substrate in which the particles are embedded. It has been found that a high amount of particles is not necessary to increase transmission.

The coating composition generally contains at least one solvent, which is preferably an alcohol, such as an alkanol (methanol, ethanol, propanol . . . ) or a glycol monoether (e.g., Dowanol PM® from Dow Chemical), a ketone (such as methyl ethyl ketone), propylene carbonate or water. The solvent is preferably an organic solvent such as methanol. The particles are suitably dispersed or suspended in the composition by mixing, sonicating, shaking, vibrating, flowing, stirring, agitating, and the like.

The total amount of solvent depends on the nature of the mold to be coated, and on the coating process. The purpose of the solvent is to achieve good surface wetting and a specific coating viscosity range determined by the coating equipment used to achieve a specific coating thickness range. The solvent or mixture of solvents typically represents from 25 to 95% of the weight of the composition, preferably from 50 to 85%.

In one embodiment of the invention, the coating composition comprises at least one silane coupling agent (or a hydrolysate thereof), which is used to functionalize the (colloidal) particles before deposition on the mold surface, thus obtaining reactive particles. This may help to promote adhesion of the particles to the polymer matrix by developing interactions. By this way, functionalized particles may improve the surface cohesion and mechanical properties of the substrate. The presence of a silane coupling agent allows to obtain an abrasion resistance that is higher than that of the polymer matrix.

Silane coupling agents are compounds containing functional groups that react or bond with both organic and inorganic materials. A silane coupling agent will act at an interface between an organic polymer matrix and an inorganic particle, to bond, or couple, the two dissimilar materials.

The (colloidal) particles are preferably modified with a silane containing a reactive organic group connected to the silicon atom through a carbon atom, such as an epoxysilane, an aminosilane, an unsaturated silane or a mixture thereof, more preferably with an epoxyalkoxysilane, an amino alkoxysilane, an unsaturated alkoxysilane or a mixture thereof. These reactive groups may react with each other or further crosslink with reactive material of the substrate matrix, such as polymerizable compounds, during the preparation of the optical article, providing a dense network and thus a harder substrate surface.

Examples of epoxyalkoxysilanes able to react both with particles surface and polymer matrix are γ-glycidoxypropyl-trimethoxysilane (glymo), γ-glycidoxypropyl-pentamethyl-disiloxane, γ-glycidoxypropyl-methyl-diisopropenoxysilane, γ-glycidoxypropyl-methyl-diethoxysilane, γ-glycidoxypropyl-dimethyl-ethoxysilane, γ-glycidoxypropyl-diisopropyl-ethoxysilane and γ-glycidoxypropyl-bis (trimethylsiloxy) methylsilane. Further examples of useful epoxyalkoxysilanes can be found in WO 2012/062790, in the name of the applicant. The preferred epoxyalkoxysilane is glymo.

The unsaturated alkoxysilane preferably comprises a terminal ethylenic double bond, and can be, e.g., a vinylsilane, an allylsilane, an acrylic silane or a methacrylic silane.

Examples of vinylsilanes are vinyltris(2-methoxyethoxy) silane, vinyltrisisobutoxysilane, vinyltri-t-butoxysilane, vinyltriphenoxysilane, vinyltrimethoxysilane, vinyltriisopropoxysilane, vinyltriethoxysilane, vinyltriacetoxysilane, vinylmethyldiethoxysilane, vinylpropyltrimethoxysilane, vinylmethyldiacetoxy-silane, vinylbis(trimethylsiloxy)silane and vinyldimethoxyethoxysilane.

Examples of allylsilanes are allyltrimethoxysilane, allyltriethoxysilane, allylpropyltrimethoxysilane and allyltris (trimethylsiloxy)silane.

Examples of acrylic silanes are 3-acryloxypropyltris (trimethylsiloxy) silane, 3-acryloxy-propyl-trimethoxysilane, acryloxy-propylmethyl-dimethoxy-silane, 3-acryloxy-propyl-methylbis (trimethylsiloxy) silane, 3-acryloxypropyl-dimethylmethoxysilane, N-(3-acryloxy-2-hydroxypropyl)-3-aminopropyltriethoxysilane.

Examples of methacrylic silanes are 3-methacryloxypropyltris (vinyldimethoxylsiloxy) silane, 3-methacryloxypropyltris (trimethylsiloxy) silane, 3-methacryloxypropyltris (methoxyethoxy) silane, 3-methacryloxy-propyl-trimethoxysilane, 3-methacryloxypropyl-pentamethyl-disiloxane, 3-meth-acryloxy-propyl-methyldimethoxysilane, 3-meth-acryloxy-propylmethyl-diethoxy-silane, 3-methacryloxy-propyl-dimethyl-methoxysilane, 3-methacryloxy-propyl-dimethylethoxysilane, 3-methacryloxy-propenyl-trimethoxysilane and 3-methacryloxy-propylbis (trimethylsiloxy) methylsilane.

Aminosilanes coupling agents are organosilanes comprising at least one amine group, preferably NH or $NH_2$, which is preferably capable of interacting with the particles. Said aminosilane may also comprise other functional groups.

The aminosilane is preferably an alkoxysilane bearing at least one amine group, more preferably a trialkoxysilane bearing at least one amine group. Non limiting examples of aminosilanes are primary aminoalkyl silanes, secondary aminoalkyl silanes and bis-silylalkyl amines, in particular 3-aminopropyltrimethoxysilane, 3-aminopropyltriethoxysilane, N-β-(aminoethyl)-γ-aminopropyltrimethoxysilane ($H_2NCH_2CH_2NHCH_2CH_2CH_2Si(OCH_3)_3$), bis-trimethoxysilylpropylamine, and the triaminofunctional compound of formula $H_2NCH_2CH_2NHCH_2CH_2NHCH_2CH_2CH_2Si(OCH_3)_3$, which are all commercially available. Obviously, analogues of these silanes, such as ethoxy analogues, can also be used.

The preferred coupling agent is vinyltrimethoxysilane.

The coupling agent may be used under the form of a silane pre-condensed solution, namely a silane hydrolysate. The term "hydrolysate" of a silane derivative expresses the fact that it is also possible in the context of the present invention that the silane derivative has already been at least partly hydrolyzed to form silanol groups, and a certain degree of crosslinking may also have already taken place through condensation reaction of these silanol groups, before it is mixed to the other components of the coating composition. The hydrolysis may be performed as known in the art of sol-gel processing, such as disclosed in FR 2702486 and U.S. Pat. No. 4,211,823. Acidic catalysts such as hydrochloric acid or acetic acid may be used to promote the hydrolysis reaction, in the presence of water. In some embodiments, basic catalysts such as NaOH can be used instead of acidic catalysts.

The amount of silane coupling agent to be used in the mold coating composition can be easily determined by those skilled in the art with a minimum routine experimentation. It has been found that a high amount of silane coupling agent is not necessary to increase transmission. Typically, the amount of silane coupling agent introduced into the coating composition accounts for 0.1 to 10% by weight of the total weight of the composition, preferably from 0.2 to 5% by weight, more preferably from 0.3 to 3% by weight, ideally from 0.4 to 2.5% by weight.

The weight ratio of particles/silane coupling agent is preferably higher than 1.5, more preferably higher than 1.75, 2, 3, 5, 6.5, 8 or 10.

Functionalization of particles with the silane coupling agent is generally performed at room temperature, when preparing the coating composition, by mixing in the solvent the particles, the silane coupling agent and optional acidic catalyst.

The composition that is generally used to coat a mold surface may further contain small amounts, preferably from 0.005 to 1% by weight, based on the total weight of the composition, of at least one non ionic or ionic surface active compound (surfactant), to improve wetting of the mold surface. Said surfactant can include for example poly(alkylene glycol)-modified polydimethylsiloxanes or polyheptamethylsiloxanes, or fluorocarbon-modified polysiloxanes. Preferred surfactants are fluorinated surfactant such as Novec® FC-4434 from 3M (non ionic surfactant comprising fluoroaliphatic polymeric esters), Unidyne™ NS-9013, and EFKA® 3034 from CIBA (fluorocarbon-modified polysiloxane). Useful fluorinated surfactants are disclosed in WO 2010/076314. Various other additives can be included in said coating composition.

The coating composition composition containing the particles is generally applied on the mold in liquid phase by classical methods such as spin coating, dip coating or spray coating, and then dried and/or cured at room temperature or by heating to form a layer of particles.

In step (c), the particle-bearing mold is filled with a polymerizable composition. The polymerizable composition comprises polymerizable compounds such as monomers, oligomers and/or prepolymers. The preferred polymerizable compounds are allyl glycol carbonates, polythiols, episulfides, polyisocyanates, polyisothiocyanates and (meth)acrylates. The preferred combinations of polymerizable compounds are a combination of diethylene glycol bis (allylcarbonate) and eventually oligomers of diethylene glycol bis(allylcarbonate), a combination of a polyisocyanate compound and a polyol compound, a combination of a polyisocyanate compound and a polythiol compound, and a combination of a polyepisulfide compound and a polythiol compound. Examples of useful polymerizable compounds are disclosed e.g. in WO 2014/133111.

In one embodiment of the invention, the polymerizable composition is prepared by first mixing the optional absorbers such as a UV absorber with at least one first monomer to obtain a homogeneous first composition, and then at least one second monomer is optionally added in said composition to obtain a second composition. Additives such as catalysts/initiators, color balancing agents and mold release agents can be added to the first and/or second composition.

The optical material composition that has been previously described is poured into the cavity of a casting mold, which may comprise mold parts held together using a gasket or tape. Depending on the desired characteristics of the resulting optical material, degassing can be performed under reduced pressure and/or filtration can be performed under increased pressure or reduced pressure before pouring the optical material composition in the mold.

After pouring the polymerizable composition, the latter is cured. The casting mold can be heated in an oven or immersed in a water bath equipped with a cooling and/or heating device, according to a predetermined temperature program to cure the composition in the mold. The molded product may be annealed if necessary.

The conditions of the molding process are selected to embed the particles into the surface of the substrate, in particular the temperature, pressure, material of the polymer matrix, particle composition, particle structure, particle size. One of ordinary skill in the art easily avoids the particles to fuse and form a single layer on top of the product. The embedded particles are localized near the surface of the optical article, and remain discrete or form discrete embedded multi-particle-aggregates.

As previously explained, various additives can be incorporated into the mass of the substrate by methods well known in the art, preferably during the manufacture of the substrate itself.

Advantages of the present process include its simplicity and its low cost compared to the traditional method involving treating the surface of the pre-formed optical substrate with an antireflection coating. The particles are applied to the substrate directly in the mold, resulting in an optical article the surface of which is finished and suitable for use "as is" in an end use application, if desired, or which requires less subsequent surface preparation or coating treatment. The particles can be easily incorporated into the substrate in a very short processing time. As a matter of fact, the process is very straightforward and allows the preparation of economical optical articles such as lenses, for example uncoated lenses (e.g., solar lenses), with less steps than heretofore to achieve a finished surface.

The invention is applicable to all substrates by using particles having lower refractive index than the substrate matrix. Apart from transmission increase, additional properties can be obtained from this invention. For example, the particles embedded at the surface of the optical substrate can also be used as anchor for functional coating such as an antifouling or antistatic coating.

The present invention can be advantageously applied to Fresnel lenses. By "Fresnel lens" or "echelon lens", it is meant a lens based on the Fresnel focusing mechanism. Fresnel lens forming surfaces are well known and are mainly used to modify the power of an optical component. They are described, for example, in U.S. Pat. No. 3,904,281, EP 0342895, WO 2007/141440 and WO 2009/141376. The thickness-saving and/or weight-saving design principle of Fresnel lenses make them particularly suitable to myopia correcting lenses.

Generally, a Fresnel lens forming surface is an intentionally created structure comprising a set of concentric annular lens sections known as Fresnel zones, which are oriented and centered according to an optical axis. The surface comprises a concentric, coaxial series of discrete lens sections with gaps between two successive Fresnel zones, thereby forming a thinner lens with a short focal length and large diameter, compared to the corresponding single lens with a continuous surface.

Since the surface of Fresnel lenses comprises many discontinuities having generally a height higher than the thickness of the coating to be applied, typically 2 μm, it is difficult to apply uniformly a coating on this surface, without degrading the structure of the Fresnel surface, in particular without attenuating the sharp shape (i.e., discontinuities) of Fresnel surface. This problem is eliminated by the present process, by placing in the mold an insert defining a Fresnel surface comprising discontinuities in height (gaps), since colloidal particles can diffuse in every area of the lens surface, resulting in hardening every gap of the Fresnel lens surface. Even if the liquid composition applied on the mold in not uniform locally (accumulation of colloidal particles in concave parts, due to wetting properties and depletion of colloidal particles on convex/sharp parts), the final shape of the Fresnel lens will be strictly defined, yielding the expected optical performances.

The optical article according to the invention preferably has a relative light transmission factor in the visible spectrum Tv higher than or equal to 80%, preferably higher than or equal to 85%, more preferably higher than or equal to 90%, and better higher than or equal to 92%.

Although the present optical articles made from optical materials according to the invention can be used without antireflective coatings, they can be coated with antireflective coatings on one or both air/substrate interface(s) if a very high level of light transmission is desired. In such embodiments, the Tv factor preferably ranges from 87% to 99%, more preferably from 90% to 98%, even better from 92% to 97%.

The Tv factor, also called "luminous transmission" of the system, is such as defined in ISO standard 13666:1998 and is measured accordingly to standard ISO 8980-3. It is defined as the average transmission in the 380-780 nm wavelength range that is weighted according to the sensitivity of the eye at each wavelength of the range and measured under D65 illumination conditions (daylight). Transmissions are expressed for optical substrates having no coatings, in particular no antireflective coatings, measured at the center of the optical article and given for a 2 mm thick substrate, at a normal incidence of the light beam (0° from the normal).

The light cut-off wavelength of the (uncoated) optical material is preferably higher than or equal to 390 nm, more preferably higher than or equal to 395 nm. In the present disclosure, the light cut-off wavelength is defined as the wavelength below which light transmission becomes lower than 1%. In other words, it is the highest wavelength for which the transmittance is lower than 1%.

The optical article according to the invention has satisfactory color properties, which can be quantified by the yellowness index Yi. The degree of whiteness of the inventive optical material may be quantified by means of colorimetric measurements, based on the CIE tristimulus values X, Y, Z such as described in the standard ASTM E313 with illuminant C observer 2°. The optical article according to the invention preferably has a low yellowness index Yi, i.e., lower than 10, more preferably lower than 5, even better lower than 2, as measured according to the above standard. The yellowness index Yi is calculated per ASTM method E313 through the relation Yi=(127.69 X−105.92 Z))/Y, where X, Y, and Z are the CIE tristimulus values.

The following examples illustrate the present invention in a more detailed, but non-limiting manner. Unless stated otherwise, all thicknesses disclosed in the present application relate to physical thicknesses. The percentages given in the tables are weight percentages. Unless otherwise specified, the refractive indexes referred to in the present invention are expressed at 25° C. at a wavelength of 550 nm.

EXAMPLES

1. Chemicals Used

Optical substrates were prepared from a colloidal particle formulation described hereunder and, for example 1 and comparative examples C1, C2 and C3, a composition comprising three polymerizable monomers in order to produce the MR8® polythiourethane matrix (refractive index: 1.6) with embedded particles, namely norbornene diisocyanate (ISO, CAS No. 74091-64-8), pentaerythritol tetrakis (3-mercaptopropionate) (THIOL1, CAS No. 7575-23-7), and 2,3-bis((2-mercaptoethyl)thio)-1-propanethiol (THIOL2, CAS No. 131538-00-6). The polymerizable composition also contained dimethyltin dichloride as a catalyst (CAS No. 753-73-1), Seesorb® 709 (2-(2-hydroxy-5-tert-octylphenyl) benzotriazole, CAS No. 3147-75-9) as a UV absorber, Seesorb® 703 (2-(2-hydroxy-3-tert-butyl-5-methylphenyl)-5-chlorobenzotriazole, CAS No. 3896-11-5) as a UV absorber, Diaresin blue J® as a bluing agent (CAS No. 86090-40-6) and Zelec UN® as a mold release agent.

In example 3, the polymerizable composition contained two polymerizable monomers in order to produce the ORMA® matrix (refractive index: 1.5) with embedded particles, namely CR-39® (diethylene glycol bis(allyl carbonate), allyl monomer 1, CAS No. 142-22-3, commercially available from PPG Industries, Inc.) and CR-39E® (tetraallyl urethane monomer 2, commercially available from Sartomer Company, Inc. and having the designation NTX-443). The polymerizable composition also contained diisopropyl peroxydicarbonate (CAS No. 105-64-6) as an initiator and UV-9® (2-hydroxy-4-methoxybenzophenone, CAS No. 131-57-7) as a UV absorber.

In the other examples, the polymerizable composition contained the MR7® monomers (namely xylylene diisocyanate, CAS 3634-83-1, and 2,3-bis((2-mercaptoethyl)thio)-1-propanethiol, CAS 131538-00-6) in order to produce the MR7® polythiourethane matrix (refractive index: 1.67) with embedded particles.

The colloidal formulations used to embed particles in the substrate contained methanol (88.33 mL, except for example 4 and comparative example C2: 91.86 mL, in comparative examples C3 and C4: methanol was replaced with 84.78 mL of water), vinyltrimethoxysilane (CAS No. 2768-02-7, 1.5 mL), hydrochloric acid (CAS No. 7647-01-0, 1.5 mL) and a dispersion of colloidal particles. The colloidal formulation was stirred with a magnetic stirrer for 1 hour at room temperature and stored at room temperature for at least 24 hours before use.

The dispersions of colloidal particles used were either silica colloid (11.67 mL of MA-ST-HV® from Nissan Chemical, which is a 30% wt. dispersion in methanol of $SiO_2$ nanoparticles with an average particle size of 10 nm, examples 1-3), antimony pentoxide based ($Sb_2O_5$) colloid (8.14 mL of SUNCOLLOID-AMT-130S from Nissan Chemical Houston Corp., which is a 42% wt. dispersion in methanol of $Sb_2O_5$ nanoparticles with an average particle size of 7-11 nm and a refractive index of 1.66, examples 4, C2), $MgF_2$ colloid (example 5) or $ZrO_2$ colloid (15.22 mL of ZSL-20N from New Techs Co., Ltd, which is a 23% wt. dispersion in water of $ZrO_2$ nanoparticles with an average particle size of 80 nm and a refractive index of 2.18, examples C3, C4).

The surface of the molds was capped with a composition comprising ethanol (95 mL), deionized water (5 mL), octyltriethoxysilane (CAS No. 2943-75-1, 2 mL) and acetic acid (CAS No. 64-19-7, 2.5 mL). Said capping agent solution was stirred with a magnetic stirrer for 30 minutes at room temperature before use.

2. Manufacture of Optical Articles by Casting

Convex and concave plano glass molds of high refractive index having 65-80 mm diameter were first coated with the capping agent solution mentioned in § 1 by immersing the molds into the capping solution for 1 minute. The molds were dried at room temperature, then cured for 15 minutes at 110° C. in an oven and cooled down to room temperature. Next, the capped molds were sonicated with ethanol in an ultrasound bath for 1 minute at room temperature in order to rinse the excess materials. Finally, the capped molds were dried at room temperature and cleaned with a fabric to remove any dust before further process.

The capped molds were then briefly dipped in the colloidal silica formulation mentioned in § 1 and then dried at room temperature.

The molds were then assembled with a tape or a gasket and a clip. A center thickness adjustment was made to obtain 2 mm thick samples.

The formulations of example 1 and comparative examples C1, C2 and C3 were prepared in small batch size by using a 100 mL thick wall bottle fitted with a magnetic stirrer, a glass tube for nitrogen intake and a vacuum connection. The UV absorbers (Seesorb® 709: 12000 ppm; Seesorb® 703: 125 ppm) were mixed with the ISO monomer (isocyanate part, 50.6% wt.) at room temperature (25° C.) until a homogeneous mixture was obtained or, if at least one of the absorbers was not dissolved at room temperature (25° C.), under moderate heat (30° C.).

The dimethyl tin dichloride catalyst (400 ppm) was added in the reaction mixture, which was then cooled down to 10° C. prior to addition of the thiol monomers THIOL1 (23.9% wt.) and THIOL2 (25.5% wt.), and stirred under vacuum until homogeneous. The bluing agent (2100 ppm) and mold release agent (700 ppm) were added at the end of the preparation.

The assembled molds were filled with the final formulations using a cleaned syringe, and the polymerization reaction was carried out in a regulated electronic oven according to the following cycle: 10 hours at about 15-22° C., regular temperature increase from 22° C. to 130° C. during 7 hours at about 5° C./hour to 25° C./hour, and 6 hours at about 120-130° C. The molds were then disassembled to obtain lenses comprising a body of a thermoset material with embedded silica particles. The lenses were cleaned by immersion and sonication in a surfactant solution, then rinsed and dried.

The formulation of example 3 was prepared similarly. The CR-39E® monomer was first added in a beaker (2 parts by weight), followed by the CR-39® monomer (95 parts by weight). Once the mixture was homogeneous, the UV absorber UV-9® was added (0.05 parts by weight) and the beaker content was mixed until full dissolution. The di-isopropylperoxycarbonate catalyst was added (2.95 parts by weight) and the mixture was stirred thoroughly, then degassed and filtered. The assembled molds were filled with the final formulations using a cleaned syringe, and the polymerization reaction was carried out in a regulated electronic oven according to the following cycle: 3 hours at about 45-50° C., regular temperature increase during 11 hours at about 3° C./hour, and 3 hours at about 80-90° C. The molds were then disassembled to obtain lenses comprising a body of a thermoset material. The lenses were cleaned with isopropyl alcohol, then annealed for 1 h at 100° C.

FTIR was used to confirm the existence of a partly inorganic surface through the presence of Si—O peak at around 1090 $cm^{-1}$ in the case of silica colloids.

In comparative example C1 (same monomers as in example 1), the steps of capping the molds and embedding particles were omitted.

3. Testing Methods

The following test procedures were used to evaluate the optical articles prepared according to the present invention.

The light cut-off wavelengths and light transmission factors in the visible spectrum Tv were determined from the light transmission spectra, which were recorded in transmission from a wearer's view angle using a Cary 4000 spectrophotometer from Hunter, with the back (concave) side of the lens (2 mm thickness at the center) facing the detector and light incoming on the front side of the lens, under D65 illumination conditions (daylight).

The yellowness index Yi of the prepared lenses was calculated as described above, by measuring on a white background with the above spectrophotometer the CIE tristimulus values X, Y, Z such as described in the standard ASTM E 313-05, through reflection measures, with the front (convex) side of the lens facing the detector and light incoming on said front side. This way of measuring Yi, from an observer's view angle, is the closest to the actual wearing situation.

4. Optical Articles Prepared and Characterizations

The spectral characterizations of some of the lenses prepared are shown in tables 1 and 2. The results are the average from 3 batchs with 5 lenses each. It can be seen that the lens of example 1 modified with silica embedded particles exhibits almost the same optical characteristics as the unmodified lens of comparative example C1, except for the transmission in the visible range (Tv), which is increased by 1.5%.

Figure 3:
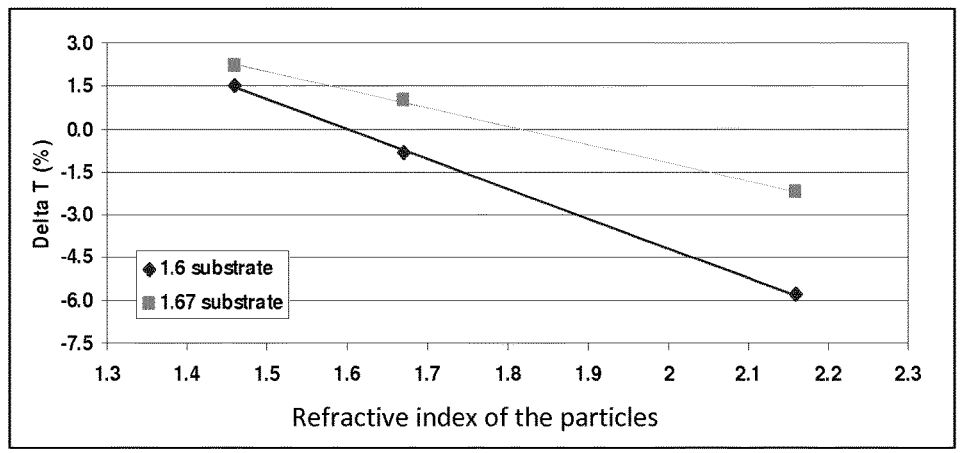

As is represented on FIG. 3, comparative examples C2, C3 and C4 reveal that particles having a higher refractive index than the substrate material lead to a decrease of transmission in the visible range (Tv), while examples 1-5 show that particles having a lower refractive index than the substrate material lead to an increase of transmission in the visible range (Tv).

Examples 1-4 show that the higher the refractive index difference between the substrate matrix and the modifying particles, the higher the transmission gain, as represented on FIG. 2.

TABLE 1

| Properties | Comparative example C1 (standard MR8 ® lens) | Example 1 (modified MR8 ® lens) |
|---|---|---|
| Polymer matrix | MR8 ® | MR8 ® |
| Refractive index of the polymer matrix | 1.6 | 1.6 |
| Embedded particles | — | $SiO_2$ n = 1.48 |
| Tv (%) | 89.38 ± 0.32 | 90.74 ± 0.05 |
| Yi | 1.85 ± 0.15 | 1.82 ± 0.08 |
| Light cut-off (nm) | 396 | 396 |

TABLE 2

| Example | 3 | 1 | C2 | C3 | 2 | 4 | C4 | 5 |
|---|---|---|---|---|---|---|---|---|
| Polymer matrix | ORMA ® | mR8 ® | MR8 ® | MR8 ® | MR7 ® | MR7 ® | MR7 ® | MR7 ® |

TABLE 2-continued

| Example | 3 | 1 | C2 | C3 | 2 | 4 | C4 | 5 |
|---|---|---|---|---|---|---|---|---|
| Refractive index of the polymer matrix | 1.5 | 1.6 | 1.6 | 1.6 | 1.67 | 1.67 | 1.67 | 1.67 |
| Embedded particles | $SiO_2$ n = 1.48 | $SiO_2$ n = 1.48 | $Sb_2O_5$ n = 1.66 | $ZrO_2$ n = 2.18 | $SiO_2$ n = 1.48 | $Sb_2O_5$ n = 1.66 | $ZrO_2$ n = 2.18 | $MgF_2$ n = 1.38 |
| % Tv increase as compared to unmodified lens | +0.1 | +1.5 | −0.8 | −5.9 | +2.25 | +0.9 | −2.1 | +10 |

It was also shown by the inventors that the use of other silane coupling agent than vinyltrimethoxysilane, such as 3-methacryloxypropyltrimethoxysilane and 3-acryloxypropyltrimethoxysilane, provided optical articles with similar transmission properties (data not provided).

The invention claimed is:

1. An optical article having a substrate and optional coatings, wherein the substrate is made of an optical material comprising a polymer matrix, the substrate comprises an external layer, and said external layer of the substrate is made of said optical material comprising said polymer matrix, and particles are embedded into said polymer matrix, a refractive index of the particles ($R_p$) is lower than a refractive index of the polymer matrix ($R_s$),
   and wherein the substrate is the base constituent of the optical article and is configured to support a stack of one or more coatings.

2. The optical article of claim 1, wherein the particles are functionalized with a silane coupling agent.

3. The optical article of claim 1, wherein the polymer matrix has a refractive index $R_s$ higher than or equal to 1.5.

4. The optical article of claim 1, wherein the polymer matrix has a refractive index $R_s$ higher than or equal to 1.6.

5. The optical article of claim 1, wherein the particles have a refractive index $R_p$ lower than or equal to 1.6.

6. The optical article of claim 1, wherein $R_p+0.1<R_s$.

7. The optical article of claim 1, wherein $R_p+0.2<R_s$.

8. The optical article of claim 1, wherein the particles are metal oxide, metal hydroxide or metal fluoride particles.

9. The optical article of claim 8, wherein the particles are $SiO_2$ or $MgF_2$ particles.

10. The optical article of claim 1, wherein an additive is contained in the particles or grafted to the particles.

11. The optical article of claim 1, wherein a light-absorbing additive is contained in the particles or grafted to the particles.

12. The optical article of claim 1, wherein the external layer of the substrate in which the particles are embedded has a thickness lower than or equal to 1 μm.

13. The optical article of claim 1, wherein the particles have a diameter of less than 150 nm.

14. A process for making the optical article of claim 1, comprising:

(a) providing a mold having an inner face;
(b) covering at least one portion of said inner face of the mold by particles;
(c) filling the mold with a polymerizable composition;
(d) curing said polymerizable composition; and
(e) obtaining an optical article having a substrate and optional coatings, wherein the substrate is made of an optical material comprising a polymer matrix, the substrate comprises an external layer, said external layer of the substrate is made of said optical material comprising said polymer matrix, and particles are embedded into said polymer matrix;
wherein the refractive index of the particles $R_p$ is lower than the refractive index of the polymer matrix $R_s$;
and wherein the substrate is the base constituent of the optical article and is configured to support a stack of one or more coatings.

15. The process of claim 14, wherein in (b), the particles are colloidal particles.

16. The process of claim 14, wherein the polymer matrix has a refractive index $R_s$ higher than or equal to 1.5.

17. The process of claim 14, wherein the polymer matrix has a refractive index $R_s$ higher than or equal to 1.6.

18. The process of claim 14, wherein the particles have a refractive index $R_p$ lower than or equal to 1.6.

19. The process of claim 14, comprising a step of capping the mold inner face with at least one capping agent before step (b).

20. A process for increasing the relative light transmission factor in the visible spectrum Tv of an optical article, the optical article having a substrate and optional coatings, wherein the substrate is made of an optical material comprising a polymer matrix, comprising embedding particles into said polymer matrix in an external layer of the substrate, wherein a refractive index of the particles ($R_p$) is lower than a refractive index of the polymer matrix ($R_s$), said external layer of the substrate is made of said optical material comprising said polymer matrix, and wherein the substrate is the base constituent of the optical article and is configured to support a stack of one or more coatings.

* * * * *